United States Patent [19]
Besen et al.

[11] Patent Number: 5,637,279
[45] Date of Patent: Jun. 10, 1997

[54] OZONE AND OTHER REACTIVE GAS GENERATOR CELL AND SYSTEM

[75] Inventors: Matthew M. Besen, Tewksbury; Donald K. Smith, Belmont, both of Mass.

[73] Assignee: Applied Science & Technology, Inc., Woburn, Mass.

[21] Appl. No.: 298,653

[22] Filed: Aug. 31, 1994

[51] Int. Cl.$^6$ .................................. C01B 13/10
[52] U.S. Cl. .................. 422/186.07; 422/186.08; 422/186.14; 422/186.15; 422/186.2; 422/186
[58] Field of Search .............. 422/186.07, 186.08, 422/186.04, 186.2, 186.14, 186.15, 186; 204/176

[56] References Cited

U.S. PATENT DOCUMENTS

| | | | |
|---|---|---|---|
| Re. 30,320 | 7/1980 | Lowther | 204/176 |
| 3,622,492 | 11/1971 | Kinney | 204/322 |
| 3,872,313 | 3/1975 | Emigh | 422/186.2 |
| 3,984,697 | 10/1976 | Lowther | 422/186.07 |
| 3,996,474 | 12/1976 | Lowther | 250/532 |
| 4,049,707 | 9/1977 | Harter et al. | 250/531 |
| 4,167,466 | 9/1979 | Orr, Jr. et al. | 204/176 |
| 4,882,129 | 11/1989 | Andrews | 422/186.2 |
| 4,970,056 | 11/1990 | Wooten et al. | 422/186.07 |
| 5,211,919 | 5/1993 | Conrad | 422/186.07 |

FOREIGN PATENT DOCUMENTS

| | | | |
|---|---|---|---|
| 1 176 100 | 8/1964 | Germany | |
| 2026622C2 | 12/1970 | Germany | C01B 13/11 |
| 1909802C2 | 8/1984 | Germany | H01T 19/00 |
| 3830106A1 | 3/1989 | Germany | C01B 13/11 |
| 60-57450 | 3/1985 | Japan | C01B 13/11 |
| 1549055 | 7/1979 | United Kingdom | C01B 13/12 |
| WO90/15018 | 12/1990 | WIPO | C01B 13/11 |

OTHER PUBLICATIONS

International Search Report for International Application No. PCT/US95/10764 dated Dec. 21, 1995.

S. Masuda et al., "A Ceramic–Based Ozonizer Using High–Frequency Discharge" *IEEE Transactions on Industry Applications* 24(2):223–231 (1988).

W.E. Cromwell et al., "Effect of Gaseous Diluents on Energy Yield of Ozone Generation from Oxygen", Ozone Chemistry and Technology, H.A. Leedy (Ed.), In Advances in Chemistry Series No. 21 (Proc. Int. Ozone Conference, Chicago, Nov. 1956) pp. 304–331.

*Primary Examiner*—John Niebling
*Assistant Examiner*—Brendan Mee
*Attorney, Agent, or Firm*—Testa, Hurwitz & Thibeault, LLP

[57] ABSTRACT

A generator cell includes a high voltage assembly having a high voltage electrode, a low voltage assembly having a low voltage electrode, a barrier dielectric between the electrodes defining a discharge region for producing a reactive gas, and a welded seal joining the assemblies to create a permanently sealed chamber between the assemblies including the discharge region. The generator cell may have a gap in the discharge region of 0.005 inch or less. The cells may be modularly combined to form a reactive gas generator system.

44 Claims, 7 Drawing Sheets

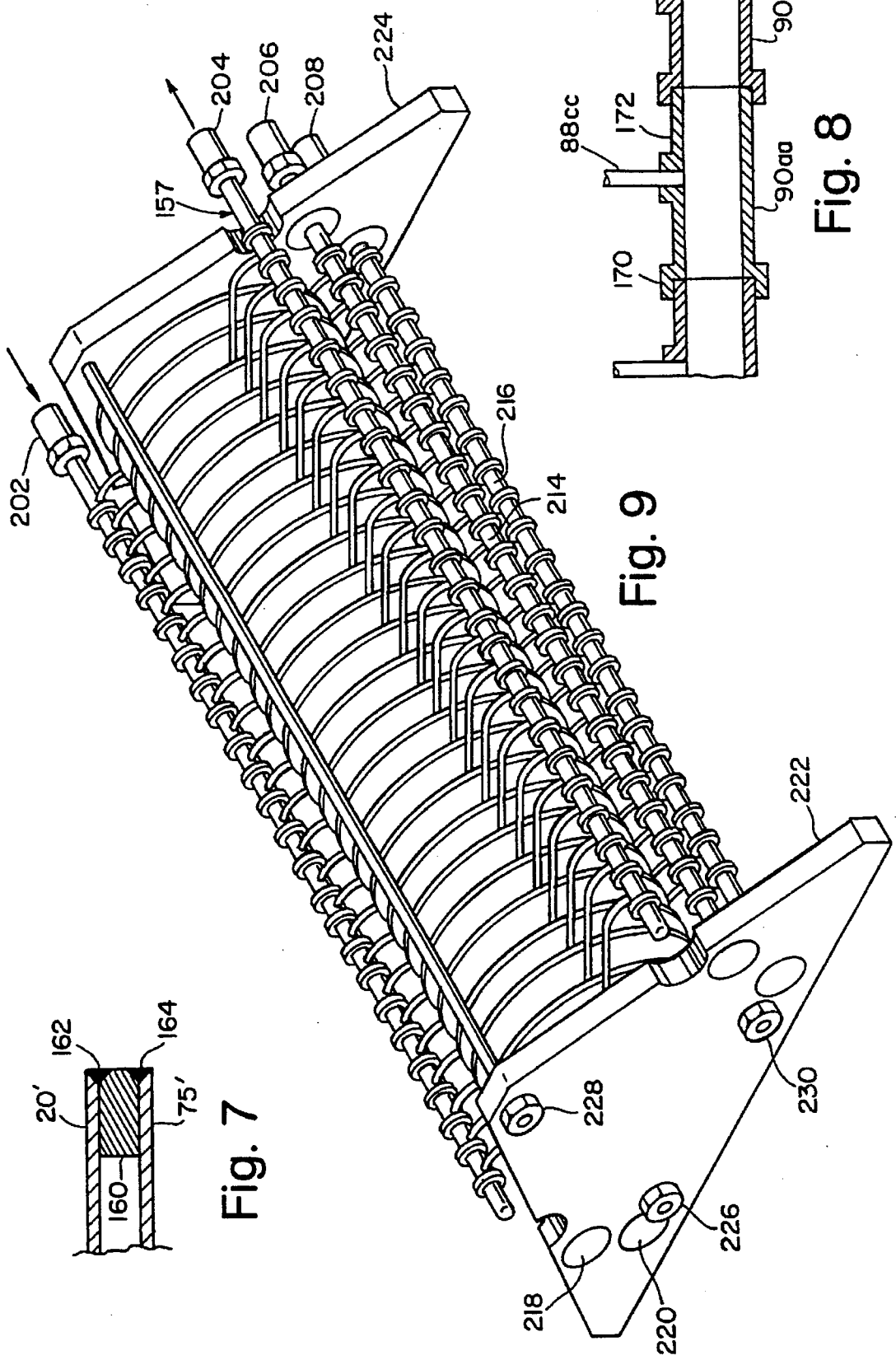

OZONE AND OTHER REACTIVE GAS GENERATOR CELL AND SYSTEM

FIELD OF THE INVENTION

This invention relates to an ozone generator cell and ozone generator system modularly employing a plurality of such cells, and more generally to a reactive gas generator cell and system.

BACKGROUND OF INVENTION

Traditionally ozone is used for water treatment and other applications where high oxidation performance is required. More recently there is emerging a need for ozone in semiconductor fabrication. One use of ozone is in the construction of layered silicon integrated circuits, especially for creating insulating layers. Ozone is also useful in semiconductor manufacturing processes such as for removing hydrocarbons and cleaning in general, which is otherwise often done with acids that are dangerous and difficult to dispose of in contrast to ozone, which reverts to oxygen and creates no such problem.

The use of ozone in the semiconductor industry has imposed increased demands on ozone generator equipment. For semiconductor applications, for example, the ozone must be very pure; yet some present ozone generators use elastomeric seals and electrode materials which can contaminate the ozone. The ozone generator in semiconductor applications should be low cost and small and compact so as to occupy as little space as possible in the manufacturing area. Yet current ozone generators are often large and may require substantial ancillary refrigeration equipment in order to achieve needed ozone production rates. In order to reduce the size and increase compactness while maintaining ozone production, some ozone generators distribute the necessary electrode area over a number of smaller cells. This introduces uneven gas flow to and from the various cells, which detracts from optimum ozone production efficiency. The industry also demands high reliability and low down time of the equipment. However, many present ozone generators use a proliferation of elastomeric seals in contact with the ozone which leads to deterioration and leaking. Further, routine helium leak detection methods require a vacuum to be applied inside the ozone generator which normally is subject to positive pressure. The nature of the seals in some such generators prevents effective helium vacuum leak detection procedures. Similar problems may occur in generation of other reactive gases.

SUMMARY OF INVENTION

It is therefore an object of this invention to provide an improved generator for ozone and other reactive gas.

It is a further object of this invention to provide such an improved generator which is lower in weight and cost, and is smaller and more compact.

It is a further object of this invention to provide such an improved generator which produces higher concentrations of ozone even without refrigeration.

It is a further object of this invention to provide such an improved generator which is highly reliable.

It is a further object of this invention to provide such an improved generator which is virtually permanently sealed and without elastomeric seals.

It is a further object of this invention to provide such an improved generator which is easily and safely tested with a helium leak detector.

It is a further object of this invention to provide such an improved generator which provides higher quality, purer ozone.

It is a further object of this invention to provide such an improved generator which is wholly modular and inexpensive to manufacture, inventory and maintain.

It is a further object of this invention to provide such an improved generator which has a balanced, uniform gas delivery to the generating cells.

It is a further object of this invention to provide such an improved generator in which the coolant need not be special coolant mediums but can be normal water.

It is a further object of this invention to provide such an improved generator in which high ozone production rates at high (>15% by weight) concentration can be obtained using water at normal tap temperatures as the coolant.

It is a further object of this invention to provide such an improved generator in which the coolant is not exposed to the high voltage on the high voltage electrode.

The invention results from the realization that a truly high performance, reliable, small, compact generator cell can be achieved by welding together two assemblies to create a permanently sealed chamber with the electrodes and barrier dielectric in between to create a sealed discharge region and from the further realization that a small gap in the discharge region in the range of five mils or less compels all of the heat generating gas creation to occur very close to the cooling structure so the gas can be generated efficiently and in high concentration at cooler temperature without the need for elaborate refrigeration equipment. The invention may be effected by applying an out-of-phase voltage across the electrodes to develop the differential voltage or one of the electrodes may be designated the low voltage electrode and connected to ground through the cooling structure. The invention also recognizes the modularity of such cells to be joined in a unitary generating system for manifolded oxygen, ozone and coolant delivery and removal.

This invention features a reactive gas generator cell including a high voltage assembly having a high voltage electrode and a low voltage assembly having a low voltage electrode. There is a barrier dielectric between the electrodes defining a discharge region for producing a reactive gas and there is a welded seal joining the assemblies to create a permanently sealed chamber between the assembly including the discharge region.

In a preferred embodiment each assembly may include a cover plate and a channel plate. Each cover plate may be a convex shell; each channel plate may include coolant channels. One of the channel plates may include an input passage and the other an output passage. The input passage may be proximate the periphery of the channel plate and the output passage may be proximate the center of the channel plate. Each channel plate may have a coolant input and a coolant output channel. Each cover plate may be stainless steel, as may each channel plate. The high voltage assembly may include an electrically insulating isolation member between the high voltage electrode and the cover and channel plates. The barrier dielectric means may include a barrier dielectric member associated with each electrode. Each barrier dielectric member may be attached to its associated electrode with a thermally conductive adhesive. The thermally conductive adhesive may include electrically conductive means. The low voltage electrode may include the cover plate. There may be spacer means for setting the gap of the discharge region. The gap may be 0.005 inch or less. The low voltage electrode may include a conductive coating on the barrier dielectric means on the side opposite the discharge region.

The invention also features a generator cell including a high voltage assembly having a high voltage electrode and a low voltage assembly having a low voltage electrode. There are barrier dielectric means between the electrodes defining a discharge region for producing reactive gas. The discharge region has a gap of 0.005 inch or less.

The invention also features a generator system which includes a plurality of modular generator cells, each cell including a high voltage assembly having a high voltage electrode, a low voltage assembly having a low voltage electrode, and barrier dielectric means between the electrodes defining a discharge region for producing a reactive gas. Each cell also includes a welded seal joining the assemblies to create a permanent sealed chamber between the assemblies including the discharge region.

In preferred embodiments each cell may include an inlet and an outlet which engage the inlets and outlets of adjacent cells to establish an inlet manifold and an outlet manifold. Each inlet may include a flow restrictor for equalizing the pressure in the inlet manifold to balance the flow to each cell. Each assembly of each cell may include a coolant inlet and a coolant outlet which engage the coolant inlets and outlets of adjacent assemblies to establish a coolant inlet manifold and a coolant outlet manifold.

The invention also features a reactive gas generator system including a first assembly including a first electrode and a second assembly including a second electrode. There is a barrier dielectric means between the electrodes defining a discharge region for producing a reactive gas, and there is a device for applying a voltage differential between the electrodes. A welded seal joins the assemblies to create a permanently sealed chamber between the assemblies including the discharge region.

In a preferred embodiment each assembly may include a cover plate and a channel plate. Each cover plate may be a convex shell and may include coolant channels. One of the channel plates may include an input passage and the other an output passage. The input passage may be proximate the periphery of the channel plate and the output passage may be proximate the center of the channel plate. Each channel plate may have a coolant input and a coolant output channel. Each cover plate as well as each channel plate may be stainless steel. The first and second assemblies may include an electrically insulating isolation member between the first and second electrodes and the cover and channel plates. The barrier dielectric means may include a barrier dielectric member associated with each electrode and the barrier dielectric member may be attached to its associated electrode with a thermally conductive adhesive. The thermally conductive adhesive may include electrically conductive means. The electrodes may include a conductive coating on the barrier dielectric means on the side opposite the discharge region. There may be spacer means for spacing the gap of the discharge region. The gap may be 0.005 inch or less. The device for providing a voltage differential may include a voltage source for applying a voltage out of phase with the first and second electrodes.

The invention also features a reactive gas generator system including a plurality of modular generator cells, each cell including a first assembly including a first electrode, a second assembly including a second electrode, and a barrier dielectric means between the electrodes defining a discharge region for producing a reactive gas. The device applies a voltage differential between the electrodes and a welded seal joins the assembly to create a permanently sealed chamber between the assemblies including the discharge region.

In a preferred embodiment each cell may include an inlet and an outlet which engage the inlets and outlets of adjacent cells to establish an inlet manifold and an outlet manifold. Each inlet may include a flow restrictor for equalizing the pressure in the inlet manifold to balance the flow to each cell. Each assembly of each cell may include a coolant inlet and a coolant outlet which engage the coolant inlets and outlets of adjacent assemblies to establish a coolant inlet manifold and a coolant outlet manifold. The device for applying a voltage differential may include a voltage source for applying a voltage out of phase to the first and second electrodes.

DISCLOSURE OF PREFERRED EMBODIMENT

Other objects, features and advantages will occur to those skilled in the art from the following description of a preferred embodiment and the accompanying drawings, in which:

FIG. 7 is a partial broken away view of an alternative welded seal for the high and low voltage assemblies;

FIG. 8 is a side schematic cross-sectional view of an alternative manifold construction to that shown in FIG. 6;

FIG. 9 is an ozone generator system with inlet and outlet gas and coolant manifolds modularly constructed from a plurality of ozone generator cells of FIG. 1;

Figure 1:
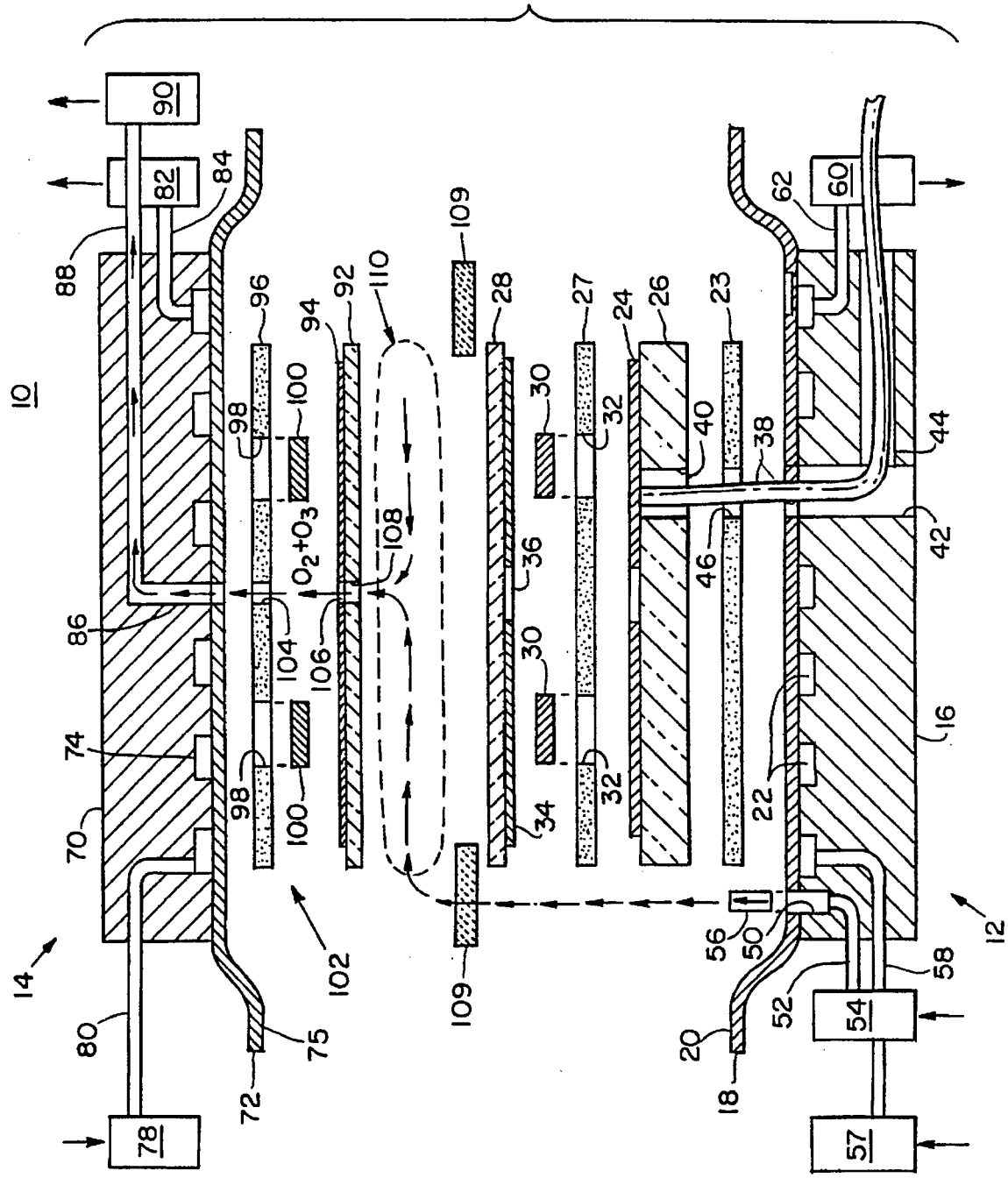
FIG. 1 is an exploded sectional schematic view of an ozone generator cell according to this invention.

There is shown in FIG. 1 an ozone generator cell 10 according to this invention including a high voltage assembly 12 and a low voltage assembly 14. High voltage assembly 12 includes a channel plate 16 and cover plate 18 which is typically nickel brazed to channel plate 16. Cover plate 18 has a convex shell-like plate with a flared circumferential rim that provides welding surface 20. The nickel brazing between cover plate 18 and channel plate 16 closes the serpentine water channels 22 in channel plate 16. High voltage assembly 12 includes high voltage electrode 24 which is typically a 0.0002 inch silver metalization approximately 3.5 inches in diameter mounted on the high voltage isolation dielectric element 26 which may be 0.090 inch thick. Isolation dielectric 26 is mounted on cover plate 18 by a thermally conductive adhesive in a layer 23 about 0.003 inch thick and about 4 inches in diameter. This could be an epoxy such as Ablestick 561K. The electrical isolation provided by isolating dielectric 26 from high-voltage electrode 24 enables the coolant used in coolant channels 22 to be normal tap water rather than more sophisticated silicone or other liquids which would be required if the voltage of electrode 24 was directly present proximate channels 22. Thermally conductive adhesive 27 may be made of an epoxy such as Ablestick 561K of a thickness of approximately 0.003 inch and approximately 4 inches in diameter. This epoxy has excellent thermal conductivity characteristics in order to transfer the heat from the discharge face of barrier dielectric 28 back through the assembly to channel plate 16. However, it does not have good electrical conductive properties and so it provided divided with vias constituted by electrically conductive elements 30 which are inserted in through-holes 32 to provide electrical conductivity. Conductive elements 30 are typically 0.003 inch thick and about 0.25 inch in diameter. A metalization layer 34 such as silver, approximately 0.0002 inch thick and about 3.5 inches in diameter is applied to the back of barrier dielectric 28 to ensure a broad and even distribution of the electrical field across barrier dielectric 28. There is a hole 36 provided in layer 34 to diminish the field in the central area of barrier dielectric 28 so that no arcing will occur across through the ozone output passage in low voltage assembly 10. Electrode 24 is energized through insulated high voltage lead wire 38 which passes through hole 40 in isolation dielectric 26 and holes 42 and 44 in channel plate 16 as well as through hole 46 in thermally conductive layer 23. Channel plate 16 includes oxygen input passage 50 which interconnects through conduit 52 with the oxygen inlet manifold element 54. A flow restrictor 56 is disposed in oxygen input passage 50 in order to equalize the pressure in the manifold formed in the ozone generator system when a plurality of modular ozone generating cells 10 are combined. The restrictors balance the flow of oxygen into each cell 10. The coolant channels 22 in channel plate 16 communicate with the water inlet element 56 through conduit 58 and with water outlet manifold element 60 through conduit 62.

Low voltage assembly 14 includes channel plate 70 and cover plate 72 which is nickel brazed to channel plate 70 to close serpentine water channels 74 in channel plate 70. Cover plate 72 has a generally convex or shell shape with a circumferential rim that provides welding surface 75 that mates with welding surface 20 on cover plate 18. Coolant channel 74 interconnects with coolant manifold inlet element 78 via conduit 80 and with coolant manifold element outlet 82 via conduit 84. While in high voltage assembly 12 the oxygen is fed in circumferentially through oxygen input passage 50 which is radially spaced from the center of assembly 12, the opposite is true with respect to low voltage assembly 14. From there the generated ozone is removed via centrally located passage 86 which interconnects through conduit 88 to the ozone manifold outlet element 90. Low voltage assembly 14 includes barrier dielectric 92 which is approximately 0.01 inch thick and 4 inches in diameter and is typically made of alumina. On the back side of dielectric barrier 92 is a conducting layer 94 similar to layer 34 on the back of barrier dielectric 28. Thermally conductive epoxy layer 96 is constructed similar to layer 27 in high voltage assembly 12 and includes holes 98 as well as conductive elements 100 to provide suitable electrical conduction. The low voltage electrode 102 in this embodiment is actually constituted by cover plate 72 as well as the vias 100 and metalized layer 94 on barrier dielectric 92, but a separate isolated electrode could be used if desired. The ozone outlet passage 86 in channel plate 70 and cover plate 72 communicates with similar bores 104 in thermally conductive layer 96 and bores 106 and 108 in metalization layer 94 and barrier dielectric 92 so that the ozone created in the barrier discharge region 110 can be properly removed. Ceramic spacers 109, 0.005 inch thick, typically disposed at 120° separation, maintain a fixed gap in the discharge region between barrier dielectrics 28 and 92. By making this gap as small as possible, typically 5 mils or less, the gas in the region is necessarily always very close to the barrier dielectrics and thus the cooling path from them to the respective channel plates 16 and 17 is quite short and efficient. This enables much better performance with higher concentration and production of ozone using less rigorous and sophisticated cooling techniques, equipment and coolants.

Figure 2:
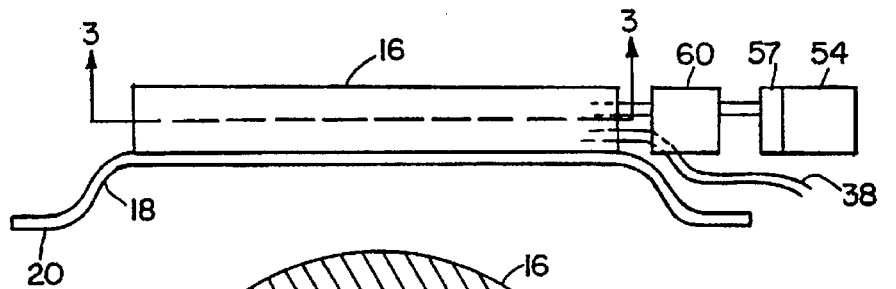
FIG. 2 is a side elevational schematic view of the high voltage assembly of the ozone generator of FIG. 1.
Figure 3:
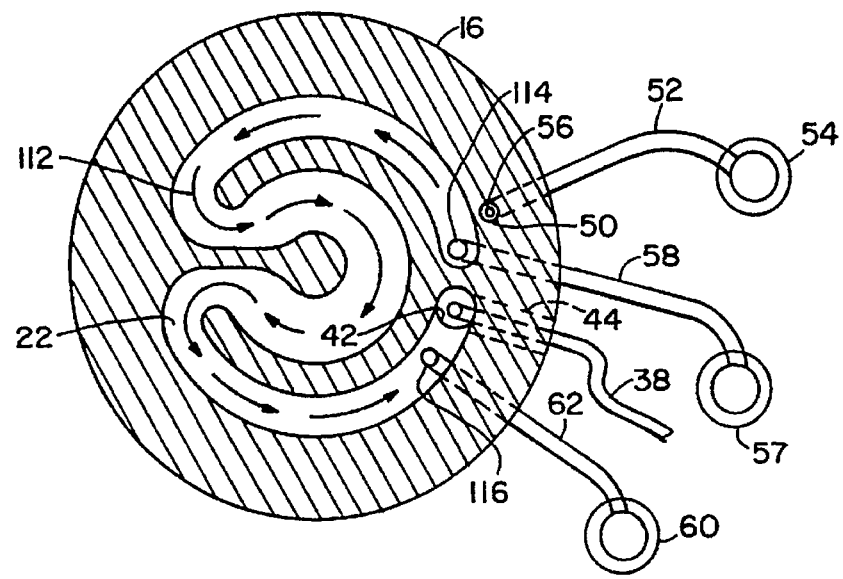
FIG. 3 is a sectional schematic view taken along line 3—3 of FIG. 2.
Figure 5:
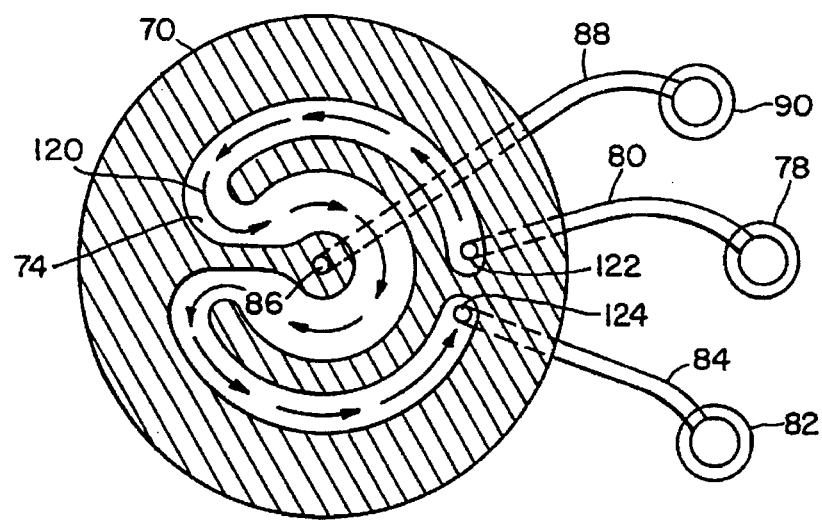
FIG. 5 is a schematic sectional view taken along lines 5—5 of FIG. 4.
Figure 4:
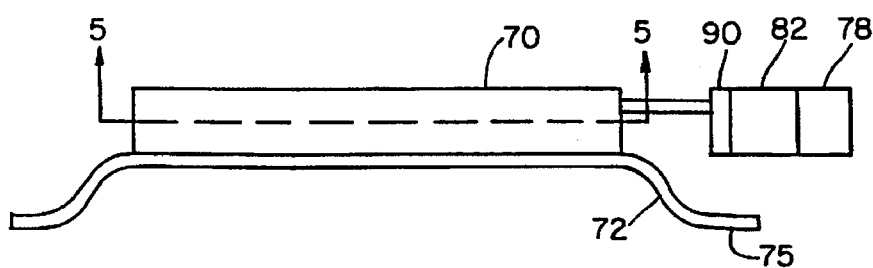
FIG. 4 is a side elevational schematic view of the low voltage assembly of the ozone generator of FIG. 1.

The coolant channels are shown in greater detail in FIGS. 2 and 3, where the serpentine flow of water for example, shown by arrows 112 in channel 22, can be seen as it moves from coolant inlet manifold element 57 through conduit 58 and port 114 into channel 22. The water or other coolant is removed from channel 22 to port 116, conduit 62 and coolant outlet manifold element 60. The gas or oxygen manifold inlet element 54 delivers oxygen through conduit 52 into passage 50 where is located flow restrictor 56. While the oxygen is delivered through port 56 about the periphery of channel plate 16, the ozone is in contrast removed through passage 86, FIGS. 4 and 5, which is at the center of channel plate 70. Passage 86 interconnects with conduit 88 to deliver the generated ozone to the gas outlet manifold element 90 Thus the oxygen is delivered peripherally and the ozone generated therefrom is extracted centrally from ozone generator cell 10. Coolant channel 74 and channel plate 70 have the same type of serpentine flow as indicated by arrow 120, FIG. 5. The flow is introduced through port 122 via conduit 80 from coolant inlet manifold element 78 and the water is extracted via port 124, conduit 84 and coolant outlet manifold element 82.

Figure 6:
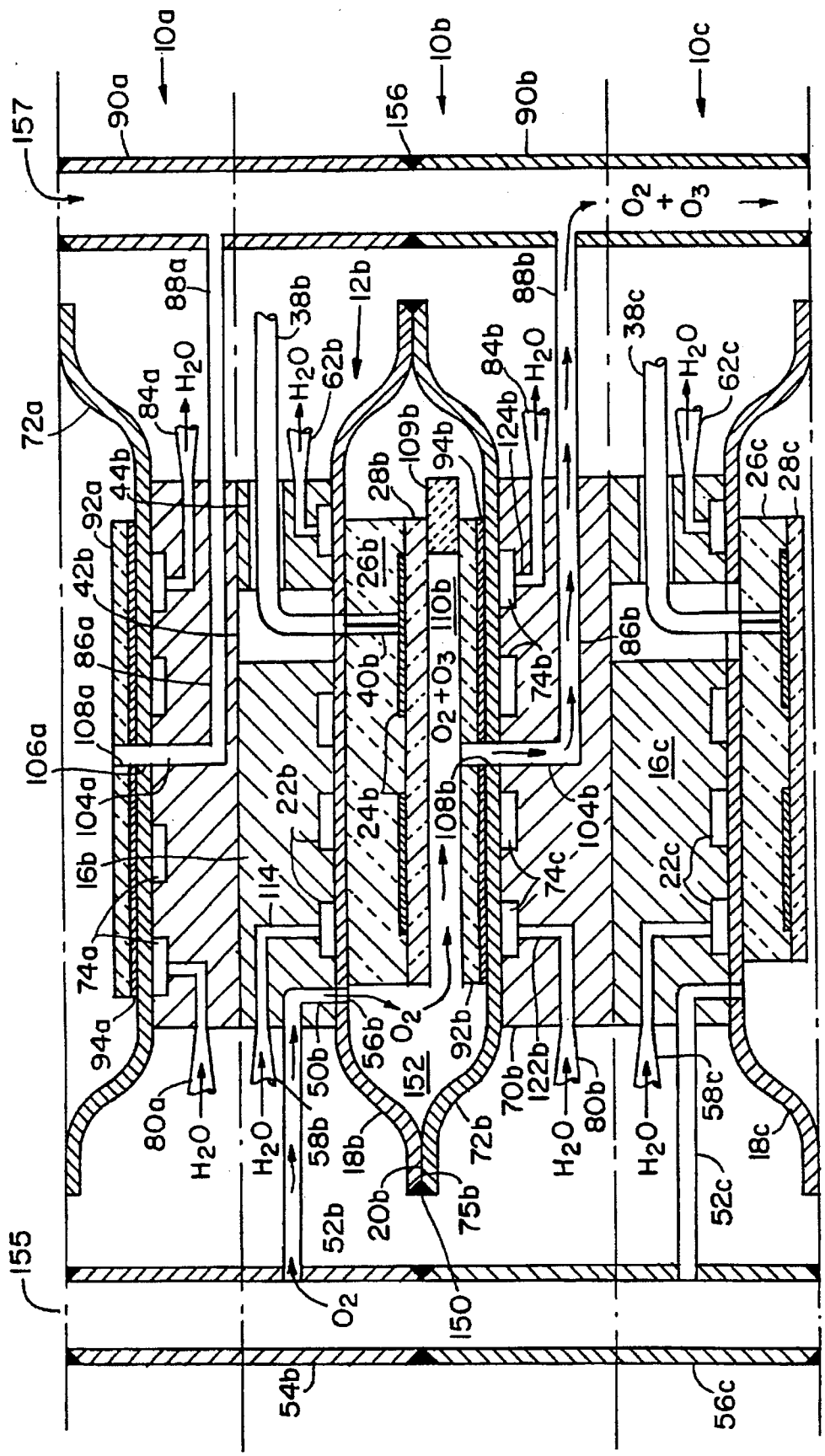
FIG. 6 is a sectional view showing the modular stacking and manifolding of the ozone generator cell of FIG. 1.

A partial stack of ozone generators 10a, 10b, 10c modularly combine to form an ozone generator system as shown in FIG. 6. There it can be seen that the welding surfaces 20b and 75b are welded with a circumferential bead 150 to create a sealed chamber in which the discharge region is disposed. Circumferential or annular channel 152 is thereby formed to receive the oxygen coming through passage 50b and flow restrictor 56b. The oxygen inlet manifold elements 54b and 54c are butt welded at 154 to create oxygen inlet manifold 155. Similarly the ozone outlet manifold elements 90a and 90b are butt welded at 156 to form ozone outlet manifold 157. The coolant inlet manifold elements 57 and 78 outlets 60 and 82 are similarly shaped and butt welded.

Although welding surfaces 20b and 75b, exemplary of all such surfaces, are shown welded directly together, this is not a necessary limitation of the invention, for as shown in FIG. 7 they could be welded together via the surfaces 20+, 75+ could be joined by an intermediate member 160 with welds at 162 and 164. Although the various manifold elements 54b, 56c, 90a and 90b are shown as straight pipes which are butt welded, this is not a necessary limitation of the invention. For example, manifold elements 90aa and 90bb in FIG. 8 may each have a flared end 170 and a straight end 172 so that the straight end 172 of each element nests in the flared end 170 of the neighboring element for a more secure sealing weld.

Figure 10:
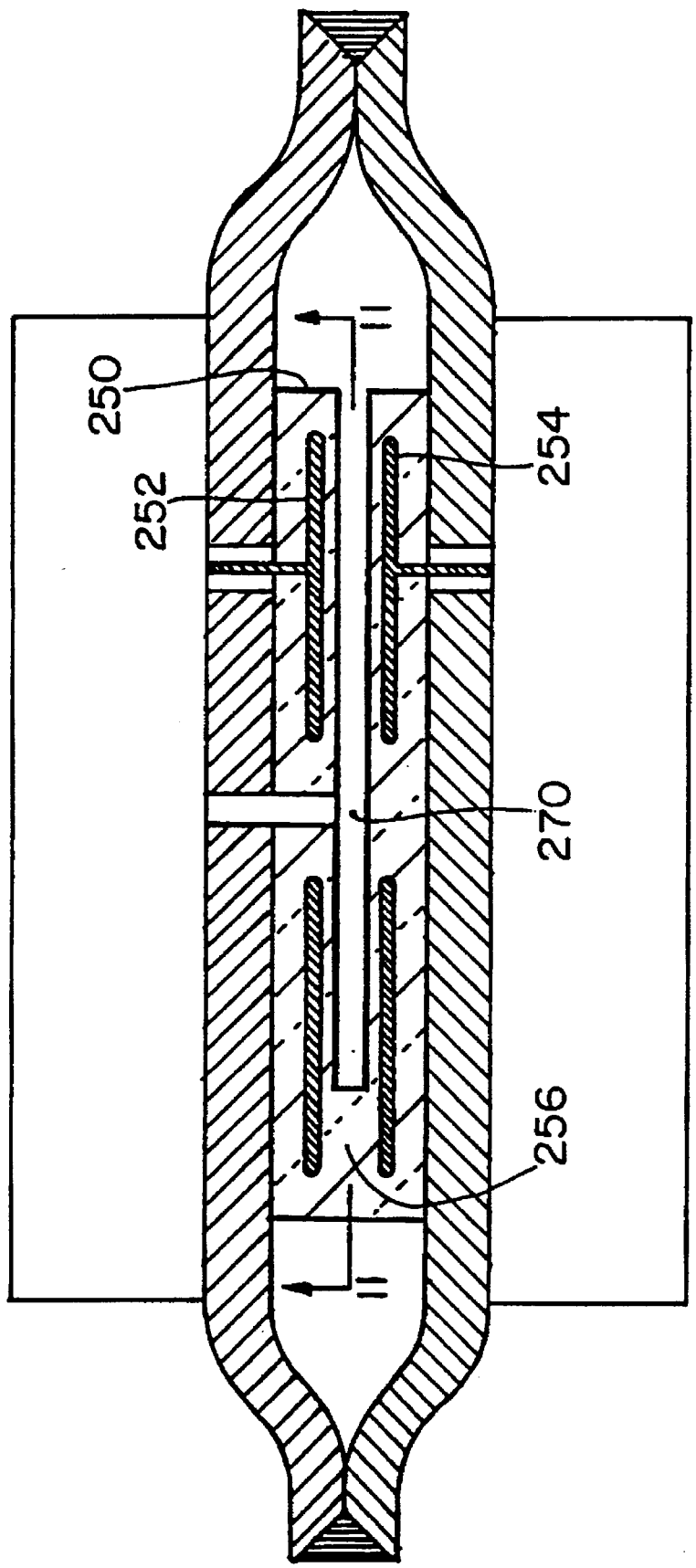
FIG. 10 is a side schematic sectional view of an alternative construction for the electrode and barrier dielectric.
Figure 11:
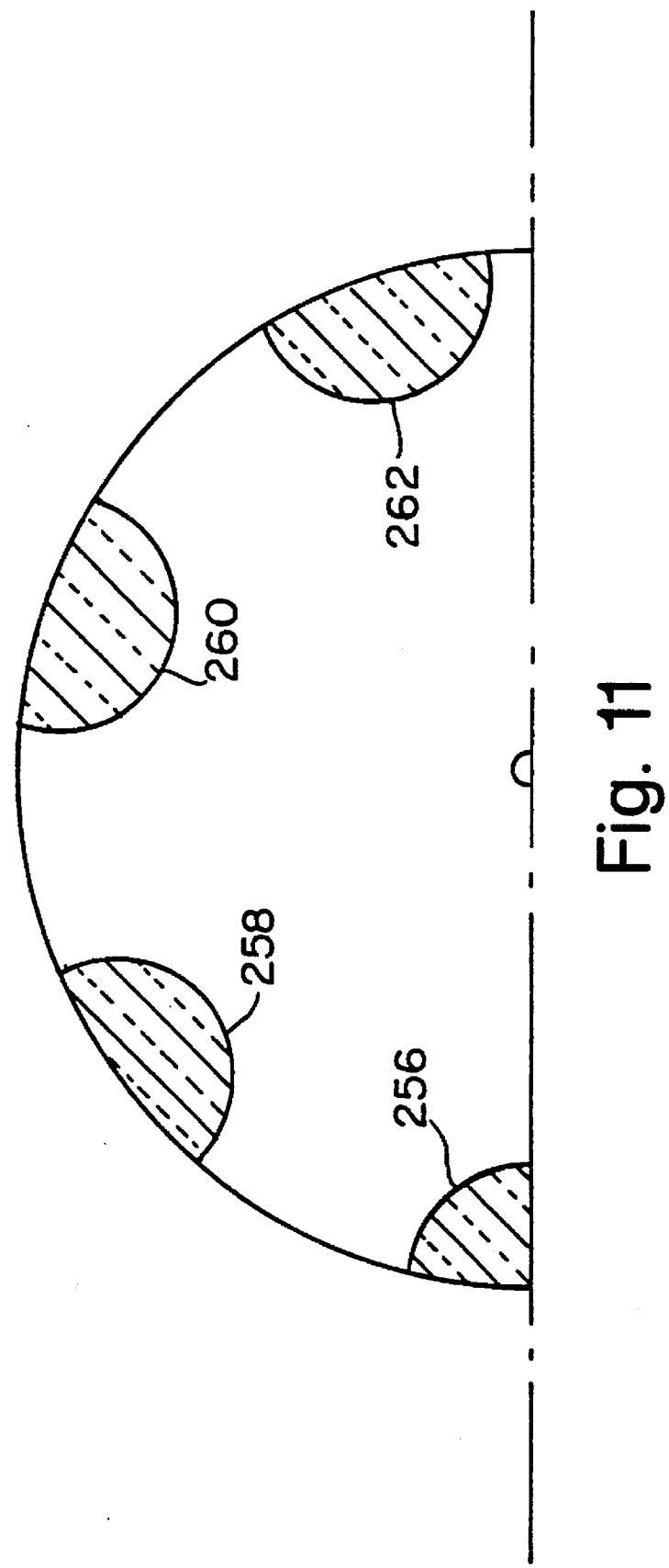
FIG. 11 is a partial plan view taken along line 11—11 of FIG. 10.

A complete ozone generator system 200, FIG. 9, includes connectors 202, 204 for gas inlet 155 and outlet 157 manifolds as well as similar connectors 206, 208 (210 and 212, not shown) for coolant inlet and outlet manifolds 214, 216, 218 and 220. The entire stack is held together between two triangular end plates 222, 224 by means of three threaded rod and nut assemblies 226, 228 and 230. In order to produce ozone generator cells even less expensively which may have even smaller gaps and better ozone production, it is contemplated that a one-piece cofired dielectric incorporating gas channels, buried electrodes, isolation and barrier dielectrics can be made, thus avoiding the use of thermally conductive epoxies proximate the electric discharge area where they are most vulnerable. Such a device is shown in FIG. 10, where the barrier dielectric 250, ground electrode 252 and high voltage electrode 254 are all embedded in the same cofired dielectric which has a plurality of peripheral integral pads 256, 258, 260, 262, . . . (264, 266 not shown), FIG. 11, which monolithically establish in discharge region 270 an even smaller gap for further improved cooling and ozone generation.

Figure 12:
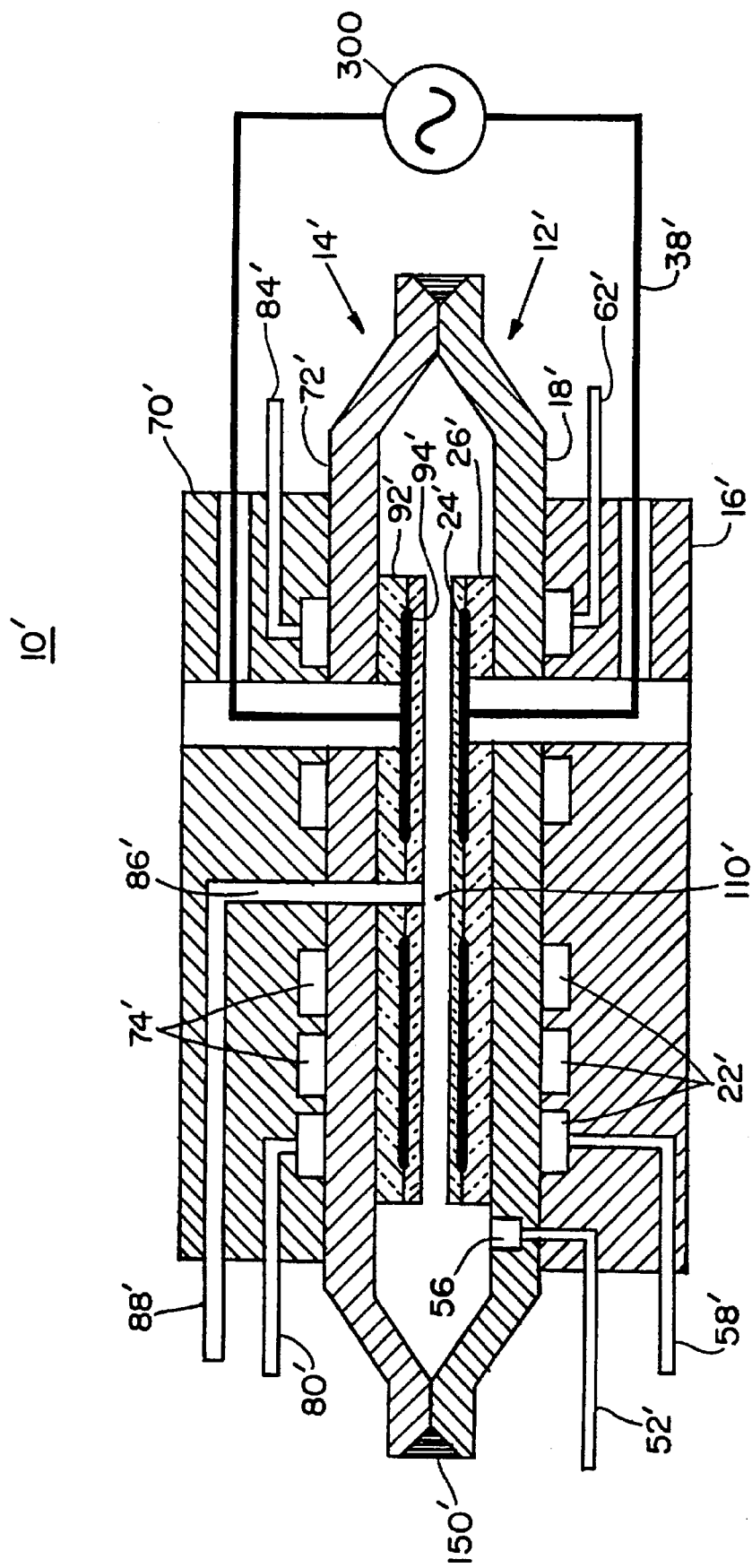
FIG. 12 is a cross-sectional diagrammatic view of an alternative construction of an ozone generator system in which both electrode assemblies are isolated.

Although thus far the preferred embodiments of the invention have been illustrated with the two electrodes nominally designated high voltage electrode and low voltage electrode, with the low voltage electrode connected to ground through the coolant structure, this is not a necessary limitation of the invention. As shown in FIG. 12, ozone generator cell 10+ according to this invention includes a first assembly 12+ and a second assembly 14+. Assembly 12+ includes a channel plate 16+ and a cover plate 18+. High voltage assembly 12+ includes high voltage electrode 24+ mounted on isolation dielectric element 26+. Assembly 14+ includes channel plate 70+ and cover plate 72+. Assembly 14+ includes barrier dielectric 92+. The voltage differential across isolated electrodes 94+ and 24+ is provided by a.c. drive 300, which applies an out-of-phase voltage across electrodes 94+ and 24+.

Although the disclosed embodiment refers to an ozone generator the invention is applicable to generation of other reactive gases as well. Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A reactive gas generator cell comprising:
   a high voltage assembly including a high voltage electrode;
   a low voltage assembly including a low voltage electrode;
   at least one barrier dielectric member disposed between said electrodes and having a front side which, at least in part, defines a discharge region for confining a reactive gas therein; and
   a welded metallic seal joining said assemblies to create a permanently sealed chamber between said assemblies including said discharge region.

2. The generator cell of claim 1 in which each said assembly includes a cover plate and a channel plate.

3. The generator cell of claim 2 in which each said cover plate is a convex shell.

4. The generator cell of claim 2 in which each said channel plate includes coolant channels.

5. The generator cell of claim 2 in which one of said channel plates includes an input passage and the other an output passage.

6. The generator cell of claim 5 in which said input passage is proximate the periphery of its said channel plate and said output passage is proximate the center of its said channel plate.

7. The generator cell of claim 2 in which each said channel plate has a coolant input and coolant output channel.

8. The generator cell of claim 2 in which each said cover plate is stainless steel.

9. The generator cell of claim 4 in which each said channel plate is stainless steel.

10. The generator cell of claim 2 in which said high and low voltage assemblies each includes an electrically insulating isolation member between said electrode and said cover and channel plates.

11. The generator cell of claim 1 in which a barrier dielectric member is associated with each electrode.

12. The generator cell of claim 11 in which each said barrier dielectric member is attached to its associated said electrode with a thermally conductive adhesive.

13. The generator cell of claim 12 in which said thermally conductive adhesive includes electrically conductive means.

14. The generator cell of claim 2 in which said low voltage electrode includes said cover plate.

15. The generator cell of claim 2 in which said low voltage electrode includes a conductive coating on said barrier dielectric means on the side opposite the discharge region.

16. The generator cell of claim 11 further including spacer means for setting a gap in said discharge region between the barrier dielectric members.

17. The generator cell of claim 16 in which said gap is 0.005 inch or less.

18. A generator cell comprising:
   a high voltage assembly including a high voltage electrode, a first cover plate and a first electrically insulating member disposed between the high voltage electrode and the first cover plate;
   a low voltage assembly including a low voltage electrode, a second cover plate and a second electrically insulating member disposed between the low voltage electrode and the second cover plate;
   at least one barrier dielectric member disposed between said electrodes and having a front side which, at least in part, defines a discharge region for confining a reactive gas therein, said discharge region including at least one spacer disposed adjacent said at least one barrier dielectric member for setting a gap in the discharge region of 0.005 inch or less; and
   a welded metallic seal joining said assemblies to create a permanently sealed chamber between said assemblies including said discharge region.

19. A generator system comprising:
   a plurality of modular reactive gas generator cells, each cell including:
   a high voltage assembly including a high voltage electrode;
   a low voltage assembly including a low voltage electrode;
   at least one barrier dielectric member disposed between said electrodes and having a front side which, at least in part, defines a discharge region for confining a reactive gas; and
   a welded metallic seal joining said assemblies to create a permanently sealed chamber between said assemblies including said discharge region.

20. The generator system of claim 19 in which each said cell includes an inlet and an ozone outlet which engage the inlets and outlets of adjacent cells to establish an inlet manifold and an outlet manifold.

21. The generator system of claim 20 in which each said inlet includes a flow restrictor for equalizing the pressure in said inlet manifold to balance the flow to each cell.

22. The generator system of claim 19 in which each said assembly of each said cell includes a coolant inlet and a coolant outlet which engage the coolant inlets and outlets of adjacent assemblies to establish a coolant inlet manifold and a coolant outlet manifold.

23. A reactive gas generator cell comprising:

a first assembly including a first electrode;

a second assembly including a second electrode;

at least one barrier dielectric member disposed between said electrodes and having a front side which, at least in part, defines a discharge region for confining a reactive gas;

a device for applying a voltage differential between said electrodes; and a welded metallic seal joining said assemblies to create a permanently sealed chamber between said assemblies including said discharge region.

24. The generator cell of claim 23 in which each said assembly includes a cover plate and a channel plate.

25. The generator cell of claim 24 in which each said cover plate is a convex shell.

26. The generator cell of claim 24 in which each said channel plate includes coolant channels.

27. The generator cell of claim 24 in which one of said channel plates includes an input passage and the other an output passage.

28. The generator cell of claim 27 in which said input passage is proximate the periphery of its said channel plate and said output passage is proximate the center of its said channel plate.

29. The generator cell of claim 24 in which each said channel plate has a coolant input and coolant output channel.

30. The generator cell of claim 24 in which each said cover plate is stainless steel.

31. The generator cell of claim 26 in which each said channel plate is stainless steel.

32. The generator cell of claim 24 in which said first and second assemblies include an electrically insulating isolation member between said first and second electrodes and said cover and channel plates.

33. The generator cell of claim 23 in which a barrier dielectric member is associated with each electrode.

34. The generator cell of claim 33 in which each said barrier dielectric member is attached to its associated said electrode with a thermally conductive adhesive.

35. The generator cell of claim 34 in which said thermally conductive adhesive includes electrically conductive means.

36. The generator cell of claim 24 in which said electrodes include a conductive coating on said barrier dielectric means on the side opposite the discharge region.

37. The generator cell of claim 23 further including spacer means for setting the gap of said discharge region.

38. The generator cell of claim 36 in which said gap is 0.005 inch or less.

39. The generator cell of claim 23 in which said device for applying a voltage differential includes a voltage source for applying a voltage out of phase to said first and second electrodes.

40. A reactive gas generator system comprising:

a plurality of modular generator cells, each cell including:

a first assembly including a first electrode;

a second assembly including a second electrode;

at least one barrier dielectric member disposed between said electrodes and having a front side which, at least in part, defines a discharge region for confining a reactive gas;

a device for applying a voltage differential between said electrodes; and a welded metallic seal joining said assemblies to create a permanently sealed chamber between said assemblies including said discharge region.

41. The generator system of claim 40 in which each said cell includes an inlet and an outlet which engage the inlets and outlets of adjacent cells to establish an inlet manifold and an outlet manifold.

42. The generator system of claim 41 in which each said inlet includes a flow restrictor for equalizing the pressure in said inlet manifold to balance the flow to each cell.

43. The generator system of claim 40 in which each said assembly of each said cell includes a coolant inlet and a coolant outlet which engage the coolant inlets and outlets of adjacent assemblies to establish a coolant inlet manifold and a coolant outlet manifold.

44. The generator system of claim 40 in which said device for applying a voltage differential includes a voltage source for applying a voltage out of phase to said first and second electrodes.

* * * * *